US007357244B2

(12) United States Patent
Grewe

(10) Patent No.: US 7,357,244 B2
(45) Date of Patent: Apr. 15, 2008

(54) DEVICE FOR FEEDING BOOK BLOCKS, BOOKS OR SIMILAR PRINTED PRODUCTS, IN STEP WITH THE WORKING CYCLE, TO A SUBSEQUENT PROCESSING MACHINE

(75) Inventor: Harald Grewe, Rahden (DE)

(73) Assignee: Kolbus GmbH & Co. KG, Rahden (DE)

( * ) Notice: Subject to any disclaimer, the term of this patent is extended or adjusted under 35 U.S.C. 154(b) by 526 days.

(21) Appl. No.: 11/110,546

(22) Filed: Apr. 19, 2005

(65) Prior Publication Data

US 2005/0236763 A1 Oct. 27, 2005

(30) Foreign Application Priority Data

Apr. 23, 2004 (DE) ...................... 10 2004 019 756

(51) Int. Cl.
*B65G 43/00* (2006.01)

(52) U.S. Cl. ............................... 198/460.1; 198/463.4; 198/459.2; 198/464.3

(58) Field of Classification Search ............. 198/463.4, 198/464.1, 464.3, 459.2, 460.1
See application file for complete search history.

(56) References Cited

U.S. PATENT DOCUMENTS 3,556,283 A * 1/1971 Brundage et al. ........ 198/460.1
4,073,375 A * 2/1978 Hart et al. ............... 198/464.3

(Continued)

FOREIGN PATENT DOCUMENTS

DE 71 25 313 10/1971
DE 34 45 928 A1 6/1986
DE 38 40 816 A1 6/1990
DE 198 10 112 A1 9/1999

*Primary Examiner*—Joe Dillon, Jr.
(74) *Attorney, Agent, or Firm*—Alix, Yale & Ristas, LLP

(57) ABSTRACT

The invention relates to a device for feeding book blocks, books or similar printed products (2), in step with the working cycle, to a subsequent processing machine. The infeed device comprises a continuous-drive accumulating conveyor (3); an arrestor (5), arranged at the downstream end of the continuous-drive accumulating conveyor (3), for cycled release of individual printed products (2); and a continuous-drive onward conveyor (11), which transports the printed products (2) by means of frictional force, for onward conveying of the separated printed products (2) to a defined transfer position (13) from which the printed products (2) are taken over, in step with the working cycle, by an infeed system (17) of the subsequent processing machine. According to the invention, the infeed device is characterized by a sensor (14), arranged in the conveyance region of the onward conveyor (11), for registering the front edge of each printed product (2); and by an infeed control device (8) for evaluating the sensor signal and for triggering the arrestor (5), wherein the time difference between the remaining processing time (from receipt of the sensor signal to the point in time when the printed product (2) is taken over by the infeed system (17)) and the theoretical transport time to the transfer position (13) (given by the conveyance speed and the conveyance distance still to be traveled) is determined; and wherein the point in time for triggering the arrestor (5) in the subsequent conveyance cycle is correspondingly corrected by the time difference. This leads to the printed products (2) being taken over by the infeed system (17) of the subsequent processing machine almost at the point in time when they arrive at the transfer position (13).

18 Claims, 1 Drawing Sheet

U.S. PATENT DOCUMENTS

| | | | | |
|---|---|---|---|---|
| 5,097,939 | A * | 3/1992 | Shanklin et al. | 198/419.2 |
| 6,032,782 | A * | 3/2000 | Sampson | 198/374 |
| 6,102,190 | A * | 8/2000 | Haas et al. | 198/633 |
| 7,055,671 | B2 * | 6/2006 | De Guglielmo et al. | 198/419.2 |
| 7,134,258 | B2 * | 11/2006 | Kalany et al. | 53/473 |
| 7,168,552 | B2 * | 1/2007 | Katayama | 198/460.1 |

* cited by examiner

DEVICE FOR FEEDING BOOK BLOCKS, BOOKS OR SIMILAR PRINTED PRODUCTS, IN STEP WITH THE WORKING CYCLE, TO A SUBSEQUENT PROCESSING MACHINE

BACKGROUND OF THE INVENTION

The present invention relates to a device for feeding book blocks, books or similar printed products, in step with the working cycle, to a subsequent processing machine In industrial book production the various processing machines are frequently interconnected to form assembly lines. On the conveyance paths between the machines, the printed products are usually conveyed in no particular order. In order to achieve feeding of the printed products, in step with the working cycle, to a subsequent processing machine, these products must first be transferred to the infeed system separately and then in a manner synchronous with the cycle. From the state of the art, infeed conveyors are known which comprise a continuous-drive accumulating conveyor with an arrestor arranged at the downstream end of the accumulating conveyor, and an onward conveyor for onward conveying of the printed products, which have been separately released, to a transfer position from which the printed products can be removed, in step with the cycle, from the infeed system of the subsequent processing machine. The onward conveyor is a continuous-drive belt conveyor or roller conveyor on which the printed products are transported by means of frictional force.

The printed products are released by the arrestor as early as possible so that despite the slip-type transport they arrive in time at the transfer position. The transfer position is defined by an end stop against which the printed products are continuously conveyed by the onward conveyor until such time as they are taken over by the infeed system. In this arrangement, the conveyor belt or the conveyor rollers of the onward conveyor slip underneath the respective printed product, which in the case of sensitive materials results in corresponding marking on the outside of the printed products.

DE 71 25 313 U1 describes an infeed system which in book binding machines is known as a so-called star feeder. The star feeder is rotating roller which rotates intermittently and cyclically, wherein the roller comprises cut-outs that are arranged in a star-shape for accommodating the printed products. The cut-outs are in each case delimited by two surfaces that are arranged at right angles in relation to each other. Star feeders are used for placing upright any printed products that are fed in a flat position. In a star feeder with six segments the printed products are fed to a section which is inclined by 30° relative to horizontal. In this arrangement, one of the two surfaces is used as an end stop, while the second surface is used to lift the printed products from the infeed conveyor. Due to the necessary interpenetration of the infeed conveyor and the star feeder, the star feeder is made from a multitude of discs which are arranged on a common shaft so as to be parallel in relation to each other, wherein individual conveyor belts of the infeed conveyor reach into the interspaces between the discs.

For increased cycle performance, star feeders comprising eight segments have been developed, which star feeders place the printed products from a flat position to the spine or the fore edge cut. The printed products are infed with the above-described infeed conveyor which is associated with the disadvantages mentioned above. Due to the transport time for feeding the printed products into the cut-out of the star feeder having been designed for an arrangement with relatively great slip, the cyclic performance of the infeed system is limited.

From DE 198 10 112 A1 a device for feeding books to a rotary device in step with the working cycle is known, which rotary device comprises a transfer conveyor with a controllable drive. By means of a sensor which is arranged in the infeed region of the transfer conveyor, the front edge of an infed printed product is registered. The deviation (being the difference in travel between the desired position and the actual position) is corrected by the control system in the drive of the transfer conveyor in such a way that the rear edge of the respective printed product is transferred, in a manner synchronous with the cycle, to catches of a conveyor arranged downstream of the transfer conveyor. In this process the respective format length of the printed products is also taken into account. With such drive control systems, a host of different tasks in conveyance systems to be controlled can be performed, wherein additional expenditure as a result of the controllable drives must be taken into account.

SUMMARY OF THE INVENTION

It is thus an object of the present invention to provide a device for feeding book blocks, books or similar printed products, in step with the working cycle, to a subsequent processing machine, which device is of simple construction and makes possible the conveyance of printed products to the transfer position in such a way that the printed products are taken over by the infeed system of the subsequent processing machine approximately at the point in time of their arrival.

An inventive aspect of achieving this object comprises evaluating the conveyance movement of a previously conveyed printed product and, based on such evaluation, correcting the point in time of activating the arrestor such that a subsequently infed printed product arrives at the transfer position at the point in time the printed product is taken over by the infeed system of the subsequent processing machine. Evaluation of the conveyance movement takes place by registering the front edge of each infed printed product by means of a sensor arranged in the conveyance region of the onward conveyor, and by determining a time difference between the remaining processing time (from receipt of the sensor signal to the point in time when the printed product is taken over by the infeed system) and the theoretical transport time to the transfer position (given by the conveyance speed and the conveyance distance still to be traveled). In the subsequent conveyance cycle the arrestor is then accordingly corrected by this time difference.

The conveyor belts or conveyor rollers of the onward conveyor no longer slip below the printed product, thus ensuring infeed without any markings. The system is self-regulating; it automatically adjusts to changed transport conditions (e.g. change in the nature of the belts). There is no need to provide regulatable drive control systems for the conveyors. The device is easy to implement from the point of view of construction. In transport conditions with reduced slip, higher cycle performance becomes possible.

BRIEF DESCRIPTION OF THE DRAWING

The features and advantages of the preferred embodiment of the present invention are described with reference to the accompanying figures, wherein.

DESCRIPTION OF THE PREFERRED EMBODIMENT

Figure 1:
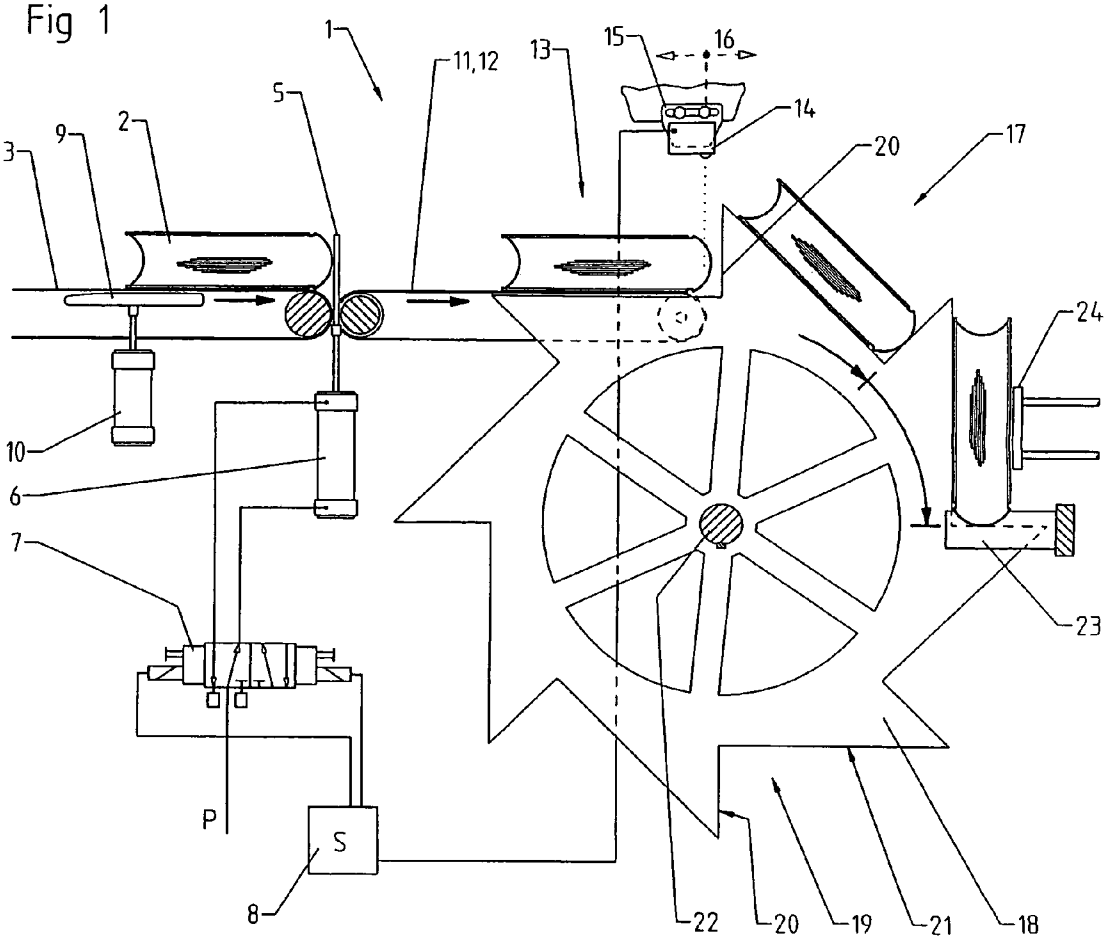
FIG. 1 a partial section view of an infeed device for a joint forming and pressing machine.

FIG. 1 shows an infeed device, overall designated 1, for a joint forming and pressing machine, which feeds books 2 that are cased in a book production line and are lying flat, in step with the working cycle, so that they then stand on their spines, to the transport system of the joint forming and pressing machine. The infeed device essentially comprises a continuous-drive accumulating conveyor 3 with an arrestor 5 arranged at the downstream end of the continuous-drive accumulator 3, a continuous-drive onward conveyor 11 which transports the books 2 by means of frictional force, and a star feeder 17 for raising the books 2 upright so that they are resting on their spines or fore edge cuts.

The accumulating conveyor 3 is made from two conveyors 4*a, b*, arranged side by side and spaced apart from each other, between which a retaining device is arranged. The retaining device comprises a brake shoe 9 and an associated pneumatic cylinder 10 as an actuating means. At first the books 2, arriving spine first from the book production line at irregular intervals, accumulate on the accumulating conveyor 3. As a result of activation of the arrestor 5, the book 2 which is first in the queue is separated and transferred to the onward conveyor 11, which is driven at increased speed. In this arrangement, the retaining device 9, 10 prevents the subsequent books 2 from being conveyed, so that a gap to the separated book 2 arises, in which gap the arrestor 5 can again enter the conveyance flow. In the case of correspondingly large-format books 2, activating the brake shoe 9 is not required because the onward conveyor 11 provides accelerated onward transport of the separated book 2. By way of an actuation means, a pneumatic cylinder 6 is associated with the arrestor 5, wherein said pneumatic cylinder 6 is driven by an electromagnetically operated pneumatic valve 7, for example a 5/2-way valve. The points in time of switching the pneumatic valve 7 are triggered by a control system 8.

The onward conveyor 11, which is arranged downstream of the accumulating conveyor 3, comprises a plurality of conveyor belts 12, arranged parallel in relation to each other. The onward conveyor 11 transports the book 2 which has been separated by the arrestor 5 onward to a transfer position 13 from which the book 2 is taken over, in step with the working cycle, by the star feeder 17. The star feeder 17 comprises a multitude of discs 18, arranged parallel in relation to each other on a common shaft 22, which reach through the interspaces of the individual conveyor belts 12 of the onward conveyor 11. In each case in the discs 18 eight cut-outs 19, evenly spaced apart around the circumference, for accepting the books 2 are provided. The cut-outs 19 are delimited by two surfaces 20, 21 placed at right angles in relation to each other. The star feeder 17 cyclically rotates intermittently (with eight standstill positions per full rotation), wherein for each cut-out 19 a first standstill position for infeeding a book 2 and a second standstill position for pushing out the book 2, which has been raised so that it is resting on its spine, into the transport system (not shown in detail) of the joint forming and pressing machine.

The star feeder is driven intermittently at a periodic cycle, commensurate with the cyclic feeding requirements of the subsequent process. In the first standstill position of a section 19, the surface 20 is used as an end stop surface for the infed book 2, by means of which the transfer position 13 is defined. Shortly thereafter, at the start of the next onward rotation of the star feeder 17, the surface 21 of the respective cut-out 19 then lifts the book 2 from the conveyor belts 12 of the onward conveyor 11. During the further progress of the intermittent rotary movement the book 2 is conveyed, via an intermediate position inclined by 45°, into the second, vertical, standstill orientation. During this process the book 2 is placed onto a saddle 23. The surface 20 and a guide rail 24 serve as guide means during the process of pushing the books out for processing in the, e.g., joint forming and presssing machine.

According to the invention, in the conveyance region of the onward conveyor 11 a control sensor at a control position, for example a light barrier 14, is provided for detecting the front edge of an infed book 2. The signal of the light barrier 14 is processed in the control device 8, wherein an evaluation of the conveyor movement as far as the slip behavior of the respective book 2 is concerned takes place. The time differential between the remaining processing time (from receipt of the sensor signal t1 to the point in time t3 when the book 2 is taken over, i.e., lifted, by the star feeder 17) and the theoretical transport time t2-t1 from the position of the sensor to the transfer position 13 (given by the set speed of the onward conveyor 11 and the still to be traveled conveyance path as the distance between the light barrier 14 and the end stop 20) is determined. For the subsequent conveyance cycle, the control device 8 corrects the respective point in time of switching the pneumatic valve 7 for deactivating the arrestor 5 and thus for releasing the next book 2 such that the book 2 arrives at the transfer position 13 at the time it is taken over by the star feeder 17, i.e., the time difference for this conveyance cycle becomes zero.

Figure 2:
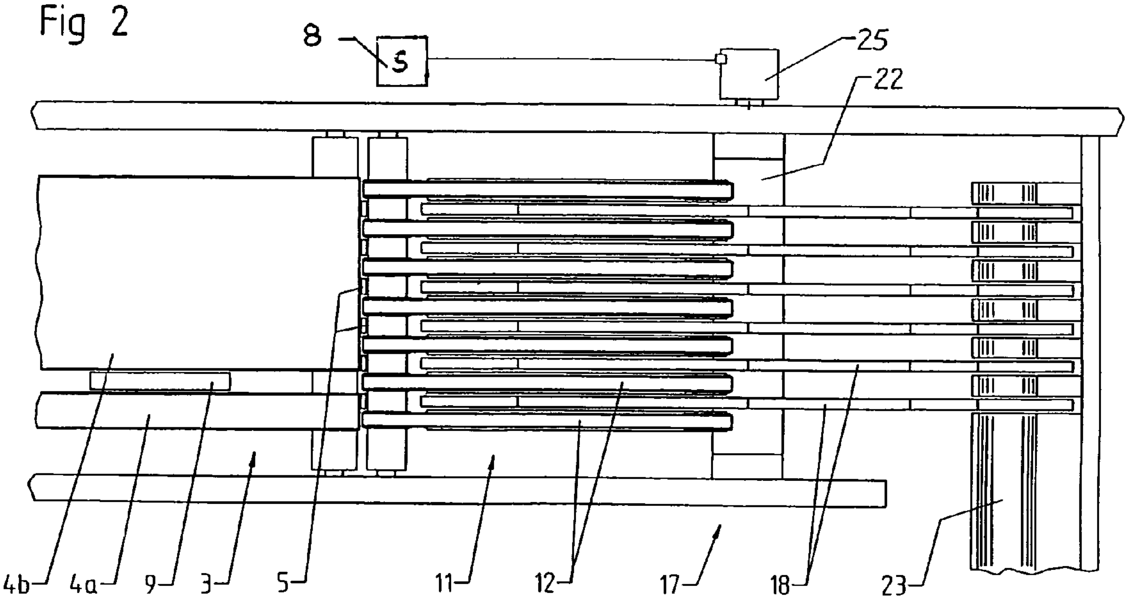
FIG. 2 a top view of the infeed device.

The point in time t2 is a theoretical moment, which is defined by the speed of conveyance V on the onward conveyor and the distance L still to be traveled by the book to the transfer position at 20, i.e., t2=L/V. The speed of conveyance V as well as the distance L is known by the control device 8. The moment t3 (taking over of the book from the onward conveyor) is defined by the machine with its certain processing steps and is a fixed point in time. The infeed system is directly coupled with the main drive. The movement of the lifting element 21 is given e.g., by a corresponding ratchet mechanism coupled with the main drive. The control device normally knows the (angular) position of the main shaft of the main drive e.g., by a shaft encoder mounted on that main shaft. Therefore the control device determines that certain time by itself without the need of an additional sensor. Of course such a sensor can be put on, (such as shown at 25 in FIG. 2) when the control device is not inherently aware of the (angular) position of the main drive.

The invention is not limited to the situation where the accumulating conveyor and onward conveyor are continuous, whereas the infeed system and process machine operate on an intermittent working cycle. The invention is extendable to a continuously driven feeder for the working cycle, but where the point in time of taking over a product by that infeed system is fixed. For example, if the star feeder is continuously rotating, then the lifting element 21 also emerges from beneath at a fixed time of the working cycle.

The book 2 which has thus been fed to the transfer position 13 is taken over by the star feeder 17 without the conveyor belts 12 of the onward conveyor 11 slipping underneath it, so that conveyance without any marks is assured. The system is self-regulating; it automatically adjusts to changed transport conditions (e.g., change in the nature of the belts). When the first (or leading) book 2 arrives, the arrestor is opened early, as is typical up to now. When the next book arrives, the infeed device 1 has already adjusted to the specific conveyance conditions relating to the books to be processed.

Safe functioning of the infeed device 1 according to the invention is provided in a simple way in that after each machine stop the time of triggering for the arrestor 5 is reset in the control device 8, so as to determine the time of triggering anew with the evaluation of the first or leading book 2 fed in after a machine restart. The invention includes the option of evaluating the time differential and resetting the triggering at intervals during a continuous run of the machine; evaluation and trigger adjustment can even be made at the same rate as the books are conveyed.

The light barrier 14 is preferably accommodated by way of a holder 15 which makes possible adjustment 16 of the light barrier 14 along the direction of conveyance of the books 2. Advantageously, the arrangement of the light barrier in the downstream end region of the onward conveyor 11 is near the end stop 20. The book 2 is now conveyed onward only a short distance so that the error in determining the time difference becomes small. Adjustability of the light barrier 14 provides the operator with the option of influencing the takeover of the book 2 by the star feeder 17. For example, displacement in the direction opposite to the direction of conveyance makes it possible to cause the book 2 to be taken over by the star feeder 17 during the actual conveyance movement, before the book reaches the stops 20 so as to achieve a quasi-fluid movement transition between the linear infeed and the subsequent rotary movement.

Thus, as a practical matter for most installations, the objective is to minimize the dwell time t3-t2, during which the book is at the transport position against stops 20, while the star feeder is not rotating but the continuous transport belts 12 are sliding against the underside of the book. However, as described immediately above, it is also possible to have a "negative" dwell time. This is achieved by displacement of the sensor, which causes a change in the distance between the sensor and the stops 20, while the control unit still works with a determined In the infeed device 1 according to the foregoing description, the slip that occurs during flat transport of books 2 on conveyance devices 3 and 11 is taken into account, for belt-type conveyors. The invention can also be applied in the case of infeed conveyors of different designs, for example where books standing on edge are transported on roller conveyors.

The invention claimed is:

1. A device for feeding printed products to a subsequent processing machine having a working cycle and a cyclic infeed system, comprising:

a continuous-drive accumulating conveyor for the products, having upstream and downstream ends;

a product arrestor arranged at the downstream end of the accumulating conveyor;

a timed trigger for the arrestor to release individual ones of the arrested products;

a continuous-drive onward conveyor which receives and transports each individual product by friction through a conveyance region to a defined transfer position from which further transport of the product is taken over by the cyclic infeed system of the subsequent processing machine;

a control sensor, arranged at a control position in the conveyance region of the onward conveyor, for generating a signal upon detecting the leading edge of each product at said control position along the conveying region; and an infeed control device responsive to the sensor signal for triggering the arrestor to release individual product, according to a control logic wherein, a first transport time interval is the measured time interval from the moment the detected product produces the sensor signal at said control position to the moment the printed product is taken over by the infeed system at the transfer position, a second transport time interval is a known time interval for the onward conveyor to translate from the control position of the sensor to the transfer position where the printed product is taken over by the infeed system, and the timing for triggering of the arrestor to release individual products subsequent to a leading product is adjusted by the time difference between said first and second time intervals associated with said leading product.

2. The device according to claim 1, wherein the sensor is arranged in the downstream end of the conveyance region of the onward conveyor.

3. The device according to claim 1, wherein the control position of the sensor is adjustable along the direction of conveyance of the products.

4. The device according to claim 1, wherein the onward conveyor delivers the products to the transfer position in a flat orientation, with a spine or fore edge cut of the product defining said leading edge, and the infeed system of the subsequent processing machine is a star feeder which rotates intermittently and cyclically, and has lift surfaces that lift the products from the onward conveyor at the transfer position, reorient the products, and place the products onto the spine or fore edge cut, for onward transfer to a transport system of the subsequent processing machine.

5. The device according to claim 1, wherein the onward conveyor comprises a plurality of conveyor belts, arranged parallel in relation to each other.

6. The device according claim 1, wherein a retaining device is arranged at the downstream end of the accumulating conveyor for temporarily preventing a second product in a queue of products from being conveyed thereon and thereby generating a conveyance gap during onward conveying of said leading product.

7. The device according to claim 1, wherein the control logic includes a triggering reset upon restart of the machine following a machine stop, whereby the time of triggering of the arrestor is reset based on the time difference between said first and second time intervals of the leading product fed in upon restart of the machine.

8. The device according to claim 2, wherein the position of the sensor is adjustable along the direction of conveyance of the products.

9. The device according to claim 2, wherein the onward conveyor delivers the products to the transfer position in a flat orientation, with a spine or fore edge cut of the product defining said leading edge, and the infeed system of the subsequent processing machine is a star feeder which rotates intermittently and cyclically, and has lift surfaces that lift the printed products from the onward conveyor at the transfer position, reorient the products, and place the products onto the spine or fore edge cut, for onward transfer to a transport system of the subsequent processing machine.

10. The device according to claim 3, wherein the onward conveyor delivers the products to the transfer position in a flat orientation, with a spine or fore edge cut of the product defining said leading edge, and the infeed system of the subsequent processing machine is a star feeder which rotates intermittently and cyclically, and has lift surfaces that lift the printed products from the onward conveyor at the transfer position, reorient the products, and place the products onto the spine or fore edge cut, for onward transfer to a transport system of the subsequent processing machine.

11. The device according to claim 4, wherein the onward conveyor comprises a plurality of conveyor belts, arranged parallel in relation to each other.

12. The device of claim 4, wherein a retaining device is arranged at the downstream end of the accumulating conveyor for temporarily preventing a second product in a queue of products from being conveyed thereon and thereby generating a conveyance gap during onward conveying of said leading product.

13. The device of claim 4, wherein the control logic includes a triggering reset upon restart of the machine following a machine stop, whereby the time of triggering of the arrestor is reset based on the time difference between said first and second time intervals of the leading product fed in upon restart of the machine.

14. The device of claim 10, wherein the onward conveyor comprises a plurality of conveyor belts, arranged parallel in relation to each other.

15. The device of claim 10, wherein a retaining device is arranged at the downstream end of the accumulating conveyor for temporarily preventing a second product in a queue of products from being conveyed thereon and thereby generating a conveyance gap during onward conveying of said leading printed product.

16. The device of claim 10, wherein the control logic includes a triggering reset upon restart of the machine following a machine stop, whereby the time of triggering of the arrestor is reset based on the time difference between said first and second time intervals of the leading product fed in upon restart of the machine.

17. The device of claim 15, wherein the control logic includes a triggering reset upon restart of the machine following a machine stop, whereby the time of triggering of the arrestor is reset based on the time difference between said first and second time intervals of the leading product fed in upon restart of the machine.

18. The device of claim 1, wherein the control logic controls the timing for the triggering of the arrestor acting on the arrested products on the accumulating conveyor based on a determination of minimizing the time difference between said first and second time intervals associated with said leading product.

* * * * *